(12) United States Patent
Kumaki et al.

(10) Patent No.: US 10,717,797 B2
(45) Date of Patent: *Jul. 21, 2020

(54) VINYL ALCOHOL COPOLYMER AND METHOD FOR PRODUCING SAME

(71) Applicant: KURARAY CO., LTD., Kurashiki-shi (JP)

(72) Inventors: Yosuke Kumaki, Kurashiki (JP); Tatsuya Tanida, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 236 days.

This patent is subject to a terminal disclaimer.

(21) Appl. No.: 15/917,958

(22) Filed: Mar. 12, 2018

(65) Prior Publication Data

US 2018/0223023 A1 Aug. 9, 2018

Related U.S. Application Data

(63) Continuation of application No. 14/785,173, filed as application No. PCT/JP2014/060891 on Apr. 17, 2014, now Pat. No. 9,951,161.

(30) Foreign Application Priority Data

Apr. 19, 2013 (JP) .................................. 2013-088189

(51) Int. Cl.

| C08F 218/08 | (2006.01) |
| C08F 114/06 | (2006.01) |
| C08F 2/00 | (2006.01) |
| C08F 290/06 | (2006.01) |
| C08F 14/06 | (2006.01) |
| C08F 216/06 | (2006.01) |
| C08F 8/12 | (2006.01) |
| C08J 3/00 | (2006.01) |
| C08F 216/12 | (2006.01) |

(52) U.S. Cl.
CPC ............ *C08F 218/08* (2013.01); *C08F 2/005* (2013.01); *C08F 8/12* (2013.01); *C08F 14/06* (2013.01); *C08F 114/06* (2013.01); *C08F 216/06* (2013.01); *C08F 290/062* (2013.01); *C08J 3/00* (2013.01); *C08F 216/125* (2013.01); *C08F 2800/10* (2013.01); *C08J 2331/04* (2013.01)

(58) Field of Classification Search
CPC ........ C08F 218/08; C08F 216/06; C08F 8/12; C08F 14/06; C08F 2/005; C08F 114/06; C08F 2800/10; C08F 216/125; C08J 2331/04; C08J 3/00
USPC ..................................................... 525/330.6
See application file for complete search history.

(56) References Cited

U.S. PATENT DOCUMENTS

| 4,725,646 A | 2/1988 | Kobashi et al. |
| 5,155,167 A | 10/1992 | Pinschmidt, Jr. et al. |
| 5,367,015 A | 11/1994 | Gutweiler et al. |
| 5,482,804 A | 1/1996 | Itoh et al. |
| 6,081,312 A | 6/2000 | Aminaka et al. |
| 2003/0218717 A1 | 11/2003 | Ichihara |
| 2004/0186232 A1 | 9/2004 | Shibutani |
| 2008/0214764 A1 | 9/2008 | Watanabe et al. |
| 2009/0111940 A1 | 4/2009 | Kato et al. |
| 2010/0324198 A1 | 12/2010 | Nii et al. |

FOREIGN PATENT DOCUMENTS

| DE | 1 042 237 B | 10/1958 | |
| DE | 1042237 B | * 10/1958 | ............ C08F 218/08 |
| DE | 10 2011 084 478 A1 | 4/2013 | |
| JP | 62-010105 A | 1/1987 | |
| JP | 3-160004 A | 7/1991 | |
| JP | 04-283749 A | 10/1992 | |
| JP | 06-080744 A | 3/1994 | |
| JP | 10-312166 A | 11/1998 | |
| JP | 2001-072720 A | 3/2001 | |
| JP | 2003-344812 A | 12/2003 | |
| JP | 2004-250695 A | 9/2004 | |
| JP | 2007-063369 A | 3/2007 | |
| WO | 2006/095462 A1 | 9/2006 | |
| WO | 2007/119735 A1 | 10/2007 | |
| WO | 2008/096727 A1 | 8/2008 | |

OTHER PUBLICATIONS

International Search Report dated Jul. 8, 2014 for PCT/JP2014/060891 filed on Apr. 17, 2014.
Extended European Search Report dated Nov. 11, 2016 in Patent Application No. 14785924.3.
Office Action dated Oct. 2, 2018 in Japanese Patent Application No. 2015-512512, 7 pages (with English language translation).
Howard G. Barth, "Characterization of Water-Soluble Polymers Using Size-Exclusion Chromatography", Advances in Chemistry, 1986, pp. 31-55.

* cited by examiner

*Primary Examiner* — Hui H Chin
(74) *Attorney, Agent, or Firm* — Oblon, McClelland, Maier & Neustadt, L.L.P.

(57) ABSTRACT

Provided is a vinyl alcohol-based copolymer, obtained by saponifying a copolymer of vinyl acetate and a polyfunctional monomer, wherein the polyfunctional monomer contains two or more ethylenic double bonds in its molecule, the vinyl alcohol-based copolymer has a side chain containing an ethylenic double bond and a molar ratio (d) of the ethylenic double bond to a total of vinyl alcohol units and vinyl acetate units is from 0.05/100 to 2/100, and the vinyl alcohol-based copolymer is water soluble.

20 Claims, 2 Drawing Sheets

VINYL ALCOHOL COPOLYMER AND METHOD FOR PRODUCING SAME

This is a continuation of U.S. application Ser. No. 14/785,173, filed Oct. 16, 2015, which is the National Stage of International application no. PCT/JP2014/060891, filed Apr. 17, 2014, which claims priority to Japanese patent application no. 2013-088189, filed Apr. 19, 2013, of which all of the disclosures are incorporated herein by reference in their entireties.

TECHNICAL FIELD

The present invention relates to a water soluble vinyl alcohol-based copolymer that is obtained by saponifying a copolymer of vinyl acetate and a polyfunctional monomer. The present invention also relates to a method of producing the vinyl alcohol-based copolymer. The present invention also relates to a dispersion stabilizer for polymerization of a vinyl-based monomer containing the vinyl alcohol-based copolymer.

BACKGROUND ART

As a vinyl alcohol-based polymer (hereinafter, may be abbreviated as a PVA) having an ethylenic double bond introduced into the molecule, those described in Patent Documents 1 to 5 below are known. Patent Document 1 describes a PVA post-modified with a reactive molecule containing an ethylenic double bond, thereby having an ethylenic double bond introduced into the side chain of the PVA. Patent Document 2 describes a product obtained by, after obtaining a vinyl ester-based copolymer having a protected ethylenic double bond, removing the protection and saponifying it. Patent Document 3 describes a PVA having an ethylenic double bond introduced into an end of the molecular chain using aldehyde or the like as a chain transfer agent. Patent Document 4 describes a product obtained by washing and drying after obtaining a carboxyl group containing PVA by saponification after copolymerizing a maleic acid derivative and a vinyl ester monomer, thereby randomly introducing an ethylenic double bond using the carboxyl group as a starting point into the main chain. Patent Document 5 describes a product obtained by washing and drying what is saponified after copolymerizing carbon monoxide and a vinyl ester monomer, thereby introducing an enone structure into the main chain.

These PVAs having an ethylenic double bond introduced into the molecule are widely utilized as a photosensitive material and a dispersion stabilizer for suspension polymerization and emulsion polymerization of a vinyl-based monomer. Among all, when these PVAs are used as a dispersion stabilizer for polymerization, the ethylenic double bond present in the molecular chain of the PVA is involved in chemical bond formation with dispersoids and high polymerization stability is exhibited even in a small amount of use.

However, in the production methods described in Patent Documents 1 and 2 above, a step for introducing an ethylenic double bond into the PVA is separately necessary other than the step of producing a PVA. Performance of them is therefore limited from the economic perspective. When an ethylenic double bond is introduced into the main chain of the PVA molecule by the production methods described in Patent Documents 3, 4, and 5 above, such PVAs are easily colored by heating and thus their use is limited. In addition, when such PVAs are used as dispersion stabilizers for polymerization, there is a problem of coloration of the polymers to be produced.

PRIOR ART DOCUMENTS

Patent Documents

Patent Document 1 JP 04-283749A
Patent Document 2 JP 2001-072720A
Patent Document 3 JP 2004-250695A
Patent Document 4 JP 2007-063369A
Patent Document 5 WO No. 2008/96727

SUMMARY OF THE INVENTION

Problems to be Solved by the Invention

The present invention has been made to solve the above problems and is to provide a water soluble vinyl alcohol-based copolymer having an ethylenic double bond introduced into a side chain. It is also to provide a method of easily producing such copolymer. It is further to provide a dispersion stabilizer for polymerization capable of exhibiting high polymerization stability even in a small amount of use in suspension polymerization or emulsion polymerization of a vinyl-based monomer and also suppressing coloration of the polymer produced therewith.

Means of Solving the Problems

The above problems are solved by providing a vinyl alcohol-based copolymer, obtained by saponifying a copolymer of vinyl acetate and a polyfunctional monomer, wherein the polyfunctional monomer contains two or more ethylenic double bonds in its molecule, the vinyl alcohol-based copolymer has a side chain containing an ethylenic double bond and a molar ratio (d) of the ethylenic double bond to a total of vinyl alcohol units and vinyl acetate units is from 0.05/100 to 2/100, and the vinyl alcohol-based copolymer is water soluble.

At this time, it is preferred that the side chain contains a vinyl ether group. It is also preferred that the side chain contains an allyl group.

The above problems are also solved by providing a method of producing the vinyl alcohol-based copolymer, comprising: obtaining a vinyl ester-based copolymer by copolymerizing the vinyl acetate and the polyfunctional monomer; and then saponifying the vinyl ester-based copolymer.

At this time, it is preferred that the copolymerization is carried out at a molar ratio (p) of the polyfunctional monomer to the vinyl acetate from 0.1/100 to 5/100, and it is more preferred that a ratio (d/p) of the molar ratio (d) to the molar ratio (p) is from 0.2 to 0.8. It is also preferred that a rate of polymerization of the vinyl acetate is from 20% to 90%.

The above problems are also solved by providing a dispersion stabilizer for polymerization of a vinyl-based monomer, comprising the vinyl alcohol-based copolymer.

Effects of the Invention

According to the present invention, it is possible to provide a water soluble vinyl alcohol-based copolymer having an ethylenic double bond introduced into a side chain. It is also possible to provide a method of easily producing such copolymer. It is further possible to provide a dispersion stabilizer for polymerization capable of exhibiting high polymerization stability even in a small amount of dosage in suspension polymerization or emulsion polymerization of a vinyl-based monomer and suppressing coloration of the polymer produced therefrom.

MODES FOR CARRYING OUT THE INVENTION

Figure 1:
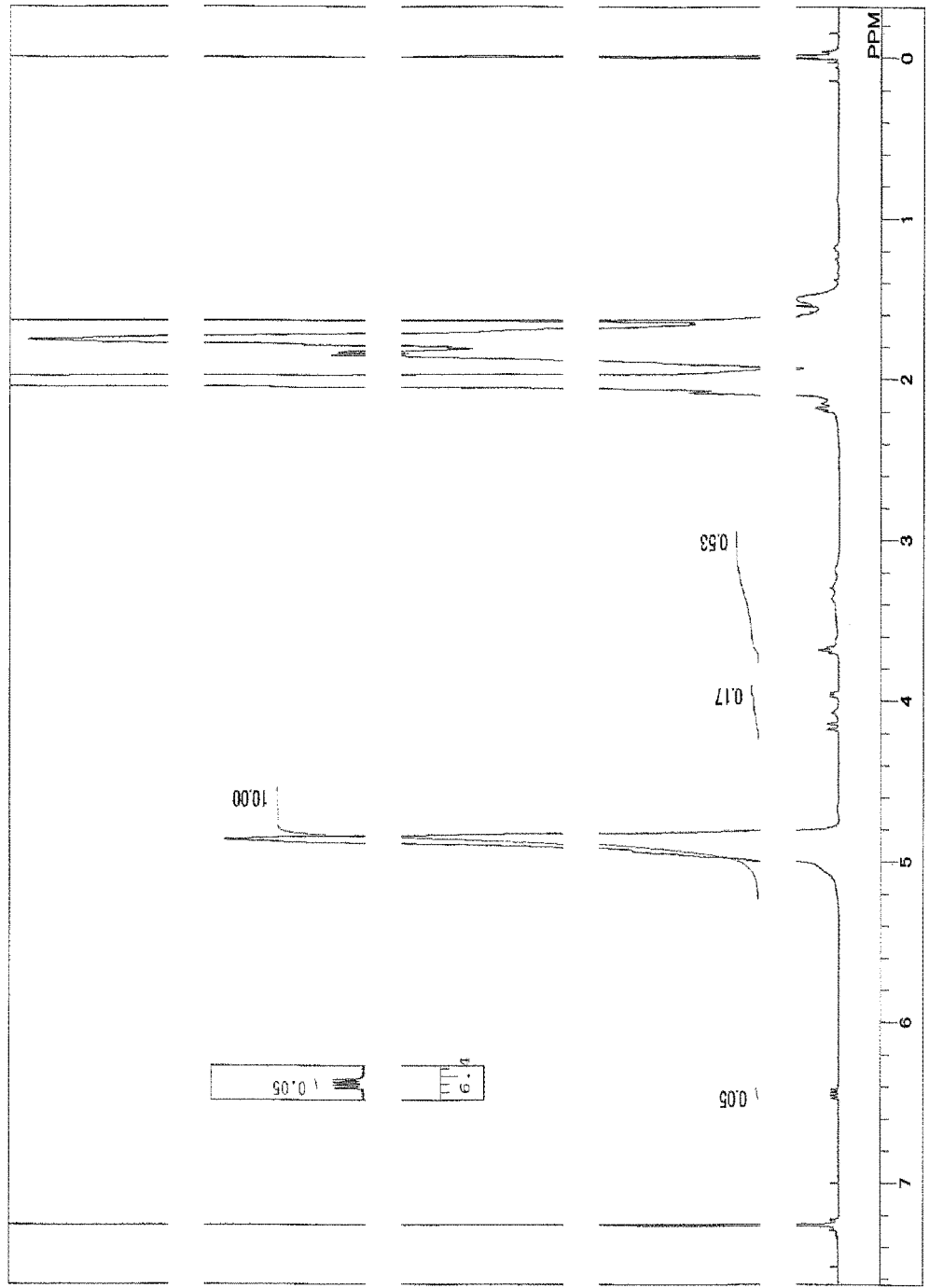
FIG. 1 is a $^1$H-NMR spectrum of polyvinyl acetate obtained in Example 1.

The present invention relates to a vinyl alcohol-based copolymer obtained by saponifying a copolymer of vinyl acetate and a polyfunctional monomer. The vinyl alcohol-based copolymer of the present invention is characterized in that it is water soluble while having a side chain containing a necessary amount of ethylenic double bond.

When a polyfunctional monomer containing two or more ethylenic double bonds in the molecule is polymerized together with vinyl acetate, it is inevitable that a plurality of ethylenic double bonds in the polyfunctional monomer react. In this case, since the polyfunctional monomer units become crosslinking points, the polymer obtained therefrom is often crosslinked and turns out to be insoluble in a solvent. However, as a result of studies by the present inventors, it was possible to obtain a water soluble vinyl alcohol-based copolymer that suppresses crosslinking while containing a necessary amount of ethylenic double bond. Detailed descriptions are given below to the vinyl alcohol-based copolymer.

The polyfunctional monomer used in the present invention contains two or more ethylenic double bonds in the molecule and is not particularly limited. However, the polyfunctional monomer should not inhibit water solubility of the vinyl alcohol-based copolymer by progress of an excessive crosslinking reaction, and also it has to be capable of introducing a necessary amount of double bond. It is required to select a polyfunctional monomer that has appropriate reactivity while considering various factors, such as a blend ratio of a polyfunctional monomer to vinyl acetate, a polymerization temperature, a monomer concentration, a rate of polymerization, and a degree of polymerization. From the perspective of suppressing an excessive crosslinking reaction, it is preferred that the number of ethylenic double bonds contained in the polyfunctional monomer is two.

Among all, preferred examples may include monomers containing a vinyl ether group like divinyl ether compounds, such as ethanediol divinyl ether, propanediol divinyl ether, butanediol divinyl ether, ethylene glycol divinyl ether, diethylene glycol divinyl ether, triethylene glycol divinyl ether, polyethylene glycol divinyl ether, propylene glycol divinyl ether, and polypropylene glycol divinyl ether.

Monomers containing an allyl group are also preferred. The monomers containing an allyl group are exemplified by diene compounds, such as pentadiene, hexadiene, heptadiene, octadiene, nonadiene, and decadiene; monomers containing an allyl ether group like diallyl ether compounds, such as glycerol diallyl ether, diethylene glycol diallyl ether, ethylene glycol diallyl ether, triethylene glycol diallyl ether, polyethylene glycol diallyl ether, trimethylolpropane diallyl ether, and pentaerythritol diallyl ether, triallyl ether compounds, such as glycerol triallyl ether, trimethylolpropane triallyl ether, and pentaerythritol triallyl ether, and tetraallyl ether compounds, such as pentaerythritol tetraallyl ether; monomers containing an allyl ester group like diallyl carboxylate, such as diallyl phthalate, diallyl maleate, diallyl itaconate, diallyl terephthalate, and diallyl adipate; monomers containing an allylamino group like diallylamine compounds, such as diallylamine and diallylmethylamine, and triallylamine; monomers containing an allylammonium group like diallylammonium salt, such as diallyldimethylammonium chloride; triallyl isocyanurate; 1,3-diallylurea; triallyl phosphate; and diallyl disulfide. Among them, monomers containing an allyl ether group are easy to control the degree of polymerization and the double bond content and used more preferably.

Further, other than the polyfunctional monomer described above, it may also include monomers having (meth)acrylic acid, such as ethylene glycol di(meth)acrylate, diethylene glycol di(meth)acrylate, triethylene glycol di(meth)acrylate, polyethylene glycol di(meth)acrylate, propylene glycol di(meth)acrylate, polypropylene glycol di(meth)acrylate, glycerol di(meth)acrylate, glycerol tri(meth)acrylate, pentaerythritol tri(meth)acrylate, trimethylolpropane tri(meth)acrylate, ditrimethylolpropane tetra(meth)acrylate, pentaerythritol tetra(meth)acrylate, dipentaerythritol hexa(meth)acrylate, and isocyanurate tri(meth)acrylate; monomers having (meth)acrylamide, such as N,N'-methylenebis(meth)acrylamide and N,N'-ethylenebis(meth)acrylamide, divinylbenzene, trivinylbenzene, and the like.

A method of producing the vinyl alcohol-based copolymer of the present invention is not particularly limited. A preferred method includes obtaining a vinyl ester-based copolymer by copolymerizing the vinyl acetate and the polyfunctional monomer; and then saponifying the vinyl ester-based copolymer.

In the production method, it is preferred that the copolymerization is carried out at a molar ratio (p) of the polyfunctional monomer to the vinyl acetate from 0.1/100 to 5/100. When the molar ratio (p) is less than 0.1/100, there is a risk that an ethylenic double bond is not easily introduced into a side chain. The molar ratio (p) is more preferably 0.15/100 or more and even more preferably 0.2/100 or more. In contrast, when the molar ratio (p) is more than 5/100, there is a risk that it is difficult to control the degree of polymerization of a vinyl ester-based copolymer. There is also a risk that a vinyl alcohol-based copolymer obtained by saponifying the vinyl ester-based copolymer is not soluble in water. The molar ratio (p) is more preferably 3/100 or less and even more preferably 2/100 or less.

As a method of copolymerization, it is possible to employ an arbitrary polymerization method, such as a bulk polymerization method, a solution polymerization method, a suspension polymerization method, and an emulsion polymerization method. The copolymerization may also be carried out in the absence of solvent or in the presence of an alcohol-based solvent. Among them, a bulk polymerization method in the absence of solvent and a solution polymerization method using an alcohol-based solvent are employed preferably. The alcohol-based solvent is not particularly limited, and methanol, ethanol, propanol, and the like, for example, may be used alone or by mixing two or more. The mode of copolymerization is not particularly limited and may be any of batch polymerization, semi-batch polymerization, continuous polymerization, and semi-continuous polymerization.

The temperature for polymerization of the vinyl acetate and the polyfunctional monomer (copolymerization temperature) is not particularly limited. The copolymerization temperature is preferably from 0° C. to 200° C. and more preferably from 30° C. to 140° C. When the temperature is lower than 0° C., a sufficient polymerization rate may not be obtained. When the temperature is higher than 200° C., there is a concern of degradation of the vinyl acetate and the polyfunctional monomer that are used.

The method of controlling a copolymerization temperature is not particularly limited. The control method may include, for example, a method of balancing the heat generated by the polymerization and the heat dissipation from the polymerization vessel surfaces by controlling the polymerization rate. It may also include a method of controlling by an external jacket using an appropriate heat medium. From the perspective of safety, the latter method is preferred.

The polymerization initiator used for copolymerization of the vinyl acetate and the polyfunctional monomer may be selected from known initiators (for example, an azo-based initiator, a peroxide-based initiator, and a redox-based initiator) in accordance with the polymerization method. The azo-based initiator may include, for example, 2,2'-azobisisobutyronitrile, 2,2'-azobis (2,4-dimethylvaleronitrile), and 2,2'-azobis (4-methoxy-2,4-dimethylvaleronitrile). The peroxide-based initiator may include, for example, percarbonate compounds, such as diisopropyl peroxydicarbonate, di-2-ethylhexyl peroxydicarbonate, and diethoxyethyl peroxydicarbonate; perester compounds, such as t-butylperoxy neodecanoate, α-cumylperoxy neodecanoate, and t-butylperoxy decanoate; acetylcyclohexylsulfonyl peroxide; 2,4,4-trimethylpentyl-2-peroxyphenoxyacetate; and the like. The initiator may also use these initiators in combination with potassium persulfate, ammonium persulfate, hydrogen peroxide, and the like. The redox-based initiator may include, for example, an initiator using the above peroxides in combination with a reducing agent, such as sodium hydrogen sulfite, sodium hydrogen carbonate, tartaric acid, L-ascorbic acid, and rongalite. When copolymerization is carried out at high temperatures, coloration caused by degradation of vinyl acetate sometimes occurs. In that case, for the purpose of prevention of coloration, it is acceptable to add approximately from 1 to 100 ppm relative to vinyl acetate of an antioxidant, such as tartaric acid, to the polymerization system.

In the copolymerization of the vinyl acetate and the polyfunctional monomer, another monomer may also be copolymerized as long as not affecting the spirit of the present invention. Such another monomer may include, for example, α-olefins, such as ethylene and propylene; (meth) acrylic acid and salts thereof; (meth)acrylic acid esters, such as methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth)acrylate, dodecyl (meth)acrylate, and octadecyl (meth)acrylate; (meth)acrylamide; (meth)acrylamide derivatives, such as N-methyl (meth)acrylamide, N-ethyl (meth)acrylamide, N,N-dimethyl (meth)acrylamide, diacetone (meth)acrylamide, (meth)acrylamide propane sulfonic acid and salts thereof, (meth)acrylamidopropyl dimethylamine and salts thereof or quaternary salts, and N-methylol (meth)acrylamide and derivatives thereof; vinyl ethers, such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; nitriles, such as acrylonitrile and methacrylonitrile; vinyl halides, such as vinyl chloride and vinyl fluoride; vinylidene halides, such as vinylidene chloride and vinylidene fluoride; allyl compounds, such as allyl acetate and allyl chloride; unsaturated dicarboxylic acids, such as maleic acid, itaconic acid, and fumaric acid, and salts thereof or esters thereof; vinylsilyl compounds, such as vinyltrimethoxysilane; isopropenyl acetates; and the like. The amount of copolymerization of such another monomer is usually 5 mol % or less.

The copolymerization of the vinyl acetate and the polyfunctional monomer may also be carried out in the presence of a chain transfer agent for the purpose of adjusting the degree of polymerization of the copolymer thus obtained and the like as long as not affecting the spirit of the present invention. The chain transfer agent may include, for example, aldehydes, such as acetaldehyde and propionaldehyde; ketones, such as acetone and methylethylketone; mercaptans, such as 2-hydroxyethanethiol; and hydrocarbon halides, such as trichloroethylene and perchloroethylene. Among all, aldehydes and ketones are used preferably. Although the amount of adding the chain transfer agent may be determined in accordance with the chain transfer constant of the chain transfer agent to be added and the degree of polymerization of the intended vinyl alcohol-based copolymer, it is preferably from 0.1 to 10 weight % approximately relative to vinyl acetate in general.

It is also preferred that the rate of polymerization of the vinyl acetate is from 20% to 90%. When the rate of polymerization is less than 20%, there is a risk of reduction in production efficiency due to decrease of the amount of the vinyl ester-based copolymer that may be produced per unit time and also there is a risk of increase in costs for recovery of vinyl acetate. From the view point of production efficiency and costs, the rate of polymerization is more preferably 30% or more and even more preferably 40% or more. In contrast, when the rate of polymerization is more than 90%, there is a risk that the crosslinking reaction excessively proceeds and the water solubility of the vinyl alcohol-based copolymer thus obtained is reduced. From the view point of suppressing the crosslinking reaction, the rate of polymerization is more preferably 80% or less and even more preferably 70% or less.

The method of saponifying the vinyl ester-based copolymer obtained by copolymerization of the vinyl acetate and the polyfunctional monomer is not particularly limited and it is possible to employ a known saponification method. For example, it may include an alcoholysis reaction or a hydrolysis reaction using a basic catalyst, such as sodium hydroxide, potassium hydroxide, and sodium methoxide, and an acid catalyst, such as p-toluenesulfonic acid. The solvent that may be used for this reaction may include, for example, alcohols, such as methanol and ethanol; esters, such as methyl acetate and ethyl acetate; ketones, such as acetone and methylethylketone; and aromatic hydrocarbons, such as benzene and toluene. These solvents may be used alone or in combination of two or more. Among all, it is preferred for the convenience to saponify using a methanol or methanol/methyl acetate mixed solution as the solvent and sodium hydroxide as the catalyst.

It is preferred that the vinyl alcohol-based copolymer of the present invention has a degree of saponification from 60 to 99.9 mol %. When the degree of saponification is less than 60 mol %, the vinyl alcohol-based copolymer sometimes becomes insoluble in water. The degree of saponification is more preferably 65 mol % or more. In contrast, when the degree of saponification is more than 99.9 mol %, it is not only difficult to industrially produce but also sometimes difficult to handle due to poor viscosity stability of an aqueous vinyl alcohol-based copolymer solution. The degree of saponification is more preferably 98 mol % or less.

The degree of saponification is a value measured in the method of measuring a degree of saponification according to JIS-K6726. At this time, units other than the vinyl alcohol units, the vinyl acetate units, and the monomer units containing an ethylenic double bond are, if contained, in a small amount and negligible.

It is preferred that the vinyl alcohol-based copolymer of the present invention has a viscosity average degree of polymerization Pη from 100 to 8000. When the viscosity average degree of polymerization Pη is less than 100, there is a risk that industrial production becomes difficult. In addition, when polymerization of the vinyl-based monomer is carried out using such vinyl alcohol-based copolymer as a dispersion stabilizer for suspension polymerization or for emulsion polymerization, the polymerization stability sometimes is reduced. The viscosity average degree of polymerization Pη is more preferably 200 or more. In contrast, when the viscosity average degree of polymerization Pη is more than 8000, it is not only difficult to industrially produce but also sometimes difficult to handle due to very high viscosity of an aqueous vinyl alcohol-based copolymer solution. The viscosity average degree of polymerization Pη is more preferably 5000 or less.

The viscosity average degree of polymerization Pη is measured according to JIS-K6726. Specifically, it may be calculated by the equation below from limiting viscosity [η] (unit: L/g) measured in water at 30° C. after resaponification and purification of the vinyl alcohol-based copolymer.

$$\text{Degree of polymerization} = ([\eta] \times 10000/8.29)^{(1/0.62)}$$

A ratio Mw/Mn of a weight average molecular weight Mw to a number average molecular weight Mn obtained from size exclusion chromatography of the vinyl alcohol-based copolymer of the present invention is preferably from 2 to 5. When the Mw/Mn is less than 2, there is a risk that industrial production becomes difficult. In addition, when the Mw/Mn is more than 5, the polymerization stability may be reduced in the case that polymerization of the vinyl-based monomer is carried out using the vinyl alcohol-based copolymer as a dispersion stabilizer for suspension polymerization or for emulsion polymerization.

The water soluble vinyl alcohol-based polymer of the present invention has a side chain containing an ethylenic double bond. Then, a molar ratio (d) of the ethylenic double bond to a total of vinyl alcohol units and vinyl acetate units is from 0.05/100 to 2/100. When the molar ratio (d) is less than 0.05/100, the polymerization stability reduces in the case that polymerization of the vinyl-based monomer is carried out using as a dispersion stabilizer for suspension polymerization or for emulsion polymerization, and thus the polymer particles thus obtained becomes coarse. The molar ratio (d) is preferably 0.07/100 or more and more preferably 0.1/100 or more. In contrast, when the molar ratio (d) is more than 2/100, it is very difficult to control the degree of polymerization of the vinyl ester-based copolymer, and the vinyl alcohol-based copolymer thus obtained is prone to become insoluble in water. The molar ratio (d) of the ethylenic double bond is preferably 1.5/100 or less and more preferably 1/100 or less.

It is preferred that the vinyl alcohol-based copolymer of the present invention has a side chain containing a vinyl ether group. It is also preferred to have a side chain containing an allyl group. Since the vinyl alcohol-based copolymer containing such side chain has water solubility while having a necessary amount of double bond, it is excellent in polymerization stability when used as a dispersion stabilizer for polymerization of the vinyl-based monomer.

An amount of the ethylenic double bond being introduced is measured from a $^1$H-NMR spectrum of the vinyl alcohol-based copolymer in a deuterium oxide or deuterated dimethyl sulfoxide solvent, or a $^1$H-NMR spectrum of the vinyl ester-based copolymer before saponification in a deuterated chloroform solvent. The amount of the ethylenic double bond being introduced is controlled by the mixing ratio or the rate of polymerization of the polyfunctional monomer to the vinyl ester-based monomer.

From the perspective of introducing a necessary amount of double bond into the vinyl alcohol-based copolymer, while suppressing a crosslinking reaction, and also maintaining the production efficiency, it is preferred that a ratio (d/p) of the molar ratio (d) of the ethylenic double bond to the total of vinyl alcohol units and vinyl acetate units to the molar ratio (p) of the polyfunctional monomer to vinyl acetate is 0.2 or more. When the ratio (d/p) is less than 0.2, the ratio of the product obtained by crosslinking the vinyl acetate and the polyfunctional monomer becomes large and there is a risk of inhibiting the water solubility of the vinyl alcohol-based copolymer. Although it is possible to increase the ratio (d/p) by adjusting the blend ratio of the polyfunctional monomer to vinyl acetate and the polymerization conditions, it is preferred that the ratio (d/p) is 0.8 or less considering the production efficiency.

The water solubility of the vinyl alcohol-based copolymer herein means water solubility to obtain an aqueous solution in which a vinyl alcohol-based copolymer having a vinyl alcohol-based copolymer concentration of 4 weight % is completely dissolved at a temperature of 90° C.

Preferred use for the vinyl alcohol-based copolymer of the present invention is a dispersion stabilizer for polymerization of a vinyl-based monomer, which is preferably used for suspension polymerization of a vinyl-based monomer. The vinyl-based monomer may include vinyl halides, such as vinyl chloride; vinyl ester monomers, such as vinyl acetate and vinyl propionate; (meth)acrylic acid and esters and salts thereof; maleic acid and fumaric acid and esters and anhydrides thereof; styrene, acrylonitrile, vinylidene chloride, vinyl ether, and the like. Among them, suspension polymerization of vinyl chloride alone or together with a monomer copolymerizable with vinyl chloride is preferred. The monomer copolymerizable with vinyl chloride may include vinyl ester monomers, such as vinyl acetate and vinyl propionate; (meth)acrylic acid esters, such as methyl (meth)acrylate and ethyl (meth)acrylate; α-olefins, such as ethylene and propylene; unsaturated dicarboxylic acids, such as maleic anhydride and itaconic acid; acrylonitrile, styrene, vinylidene chloride, vinyl ether, and the like.

For suspension polymerization of the vinyl-based monomer, it is possible to use an oil soluble or water soluble polymerization initiator that is used for polymerization of vinyl chloride monomers conventionally. The oil soluble polymerization initiator may include, for example, percarbonate compounds, such as diisopropyl peroxydicarbonate, di-2-ethylhexyl peroxydicarbonate, and diethoxyethyl peroxydicarbonate; perester compounds, such as t-butylperoxy neodecanoate, t-butylperoxy pivalate, t-hexylperoxy pivalate, and α-cumylperoxy neodecanoate; peroxides, such as acetylcyclohexylsulfonyl peroxide, 2,4,4-trimethylpentyl-2-peroxyphenoxyacetate, 3,5,5-trimethylhexanoyl peroxide, and lauroyl peroxide; and azo compounds, such as azobis-2,4-dimethylvaleronitrile and azobis(4-2,4-dimethylvaleronitrile). The water soluble polymerization initiator may include, for example, potassium persulfate, ammonium persulfate, hydrogen peroxide, cumene hydroperoxide, and the like. These oil soluble or water soluble polymerization initiators may be used alone or in combination of two or more.

In suspension polymerization of the vinyl-based monomer, it is possible to add other various additives to the polymerization reaction system as needed. The additives may include, for example, polymerization regulators, such as aldehydes, hydrocarbon halides, and mercaptans, polymerization inhibitors, such as phenol compounds, sulfur compounds, and N-oxide compounds, and the like. It is also possible to optionally add a pH adjuster, a crosslinker, and the like.

In suspension polymerization of the vinyl-based monomer, the polymerization temperature is not particularly limited and may be adjusted at, of course, a low temperature of approximately 20° C. and also at a high temperature of more than 90° C. In addition, it is also one of preferred embodiments to use a polymerization vessel with a reflux condenser to enhance heat removal efficiency of the polymerization reaction system.

The vinyl alcohol-based copolymer of the present invention may also be used as a dispersion stabilizer for emulsion polymerization. When the vinyl alcohol-based copolymer of the present invention is used as a dispersion stabilizer for emulsion polymerization, the amount of use is not particularly limited. The amount of use is preferably from 1 to 20 parts by weight in terms of solid content based on 100 parts by weight of the unsaturated monomer used for emulsion polymerization, more preferably from 2 to 15 parts by weight, and even more preferably from 3 to 13 parts by weight. When the vinyl alcohol-based copolymer is used as a dispersion stabilizer in the amount within the range above, the polymerization stability is improved more.

The unsaturated monomer may include olefins, such as ethylene, propylene, and isobutylene; olefin halides, such as vinyl chloride, vinyl fluoride, vinylidene chloride, and vinylidene fluoride; vinyl ester monomers, such as vinyl formate, vinyl acetate, vinyl propionate, and vinyl versatate; (meth)acrylic acid esters, such as(meth)acrylic acid, methacrylic acid, methyl (meth)acrylate, ethyl (meth)acrylate, butyl (meth)acrylate, 2-ethylhexyl (meth)acrylate, dodecyl (meth)acrylate, and 2-hydroxyethyl (meth)acrylate; and dimethylaminoethyl (meth)acrylate and dimethylaminoethyl methacrylate and quaternary products thereof. It may further include (meth)acrylamide-based monomers, such as (meth)acrylamide, N-methylol (meth)acrylamide, N,N-dimethyl (meth)acrylamide, (meth)acrylamide 2-methylpropane sulfonic acid and sodium salts thereof; styrene-based monomers, such as styrene, α-methylstyrene, and p-styrenesulfonic acid and sodium and potassium salts; N-vinylpyrrolydone; and diene-based monomers, such as butadiene, isoprene, and chloroprene. These unsaturated monomers may be used alone or by mixing two or more. The polymer of a preferred unsaturated monomer may include polyvinyl acetate, ethylene-vinyl acetate copolymers, and (meth)acrylic acid ester-based polymers.

In the dispersion stabilizer, additives, such as antiseptics, mildewcides, antiblocking agents, and defoamers, usually used for suspension polymerization and emulsion polymerization may be blended as needed.

When the vinyl alcohol-based copolymer of the present invention is used as a dispersion stabilizer for suspension polymerization or emulsion polymerization, the dispersion stabilizer may be used alone while it may also be used together with water soluble cellulose ethers, such as methyl cellulose, hydroxyethyl cellulose, hydroxypropyl cellulose, and hydroxypropylmethyl cellulose; water soluble polymers, such as polyvinyl alcohol and gelatin; oil soluble emulsifiers, such as sorbitan monolaurate, sorbitan trioleate, glycerol tristearate, and ethylene oxide-propylene oxide block copolymers; water soluble emulsifiers, such as polyoxyethylene sorbitan monolaurate, polyoxyethylene glycerol oleate, and sodium laurate; and the like.

When the vinyl alcohol-based copolymer of the present invention is used as a dispersion stabilizer for suspension polymerization, it may be used together with a water soluble or water dispersible dispersion stabilizing aid. As the dispersion stabilizing aid, a partially saponified PVA having a degree of saponification of less than 65 mol % and a degree of polymerization from 50 to 750, preferably a partially saponified PVA having a degree of saponification from 30 to 60 mol % and a degree of polymerization from 180 to 650 are used. The dispersion stabilizing aid may also have an ionic group, such as carboxylic acid and sulfonic acid, and the like introduced to obtain self-emulsifiability. A weight ratio (dispersion stabilizer/dispersion stabilizing aid) in the adding amount of the dispersion stabilizer to the dispersion stabilizing aid when the dispersion stabilizing aid is used together varies depending on the type of dispersion stabilizer and the like, so that it is not possible to define it uniformly while a range from 95/5 to 20/80 is preferred and from 90/10 to 30/70 is more preferred. The dispersion stabilizer and the dispersion stabilizing aid may be charged in a lump at an initial stage of polymerization or may also be charged separately during the polymerization.

The vinyl alcohol-based copolymer of the present invention has a radically polymerizable ethylenic unsaturated double bond, so that it is possible to easily form a graft product. For example, a photosensitive composition having a photopolymerization initiator added to a solution of a vinyl alcohol-based copolymer or such solution with monomers having a radically polymerizable ethylenic double bond added thereto is also preferred. It is also applicable to a resin relief plate obtained by exposing a sheet shaped from the composition and washing it.

The vinyl alcohol-based copolymer of the present invention is also particularly useful for a material of graft polymer, various adhesives, and the like other than the above use. It is also possible to use it for conventional PVA use, for example, a film, a sheet, a pipe, a separation membrane, fiber, a fiber sizing agent, a paper processing agent, a pigment dispersant, various binder use, additives for mortar and cement.

EXAMPLES

Further specific descriptions are given below to the present invention using Examples. In Examples and Comparative Examples below, "parts" and "%" mean to be based on weight unless otherwise specified.

Example 1

(Synthesis of Vinyl Alcohol-Based Copolymer having Ethylenic Double Bond in Side Chain)

Figure 2:
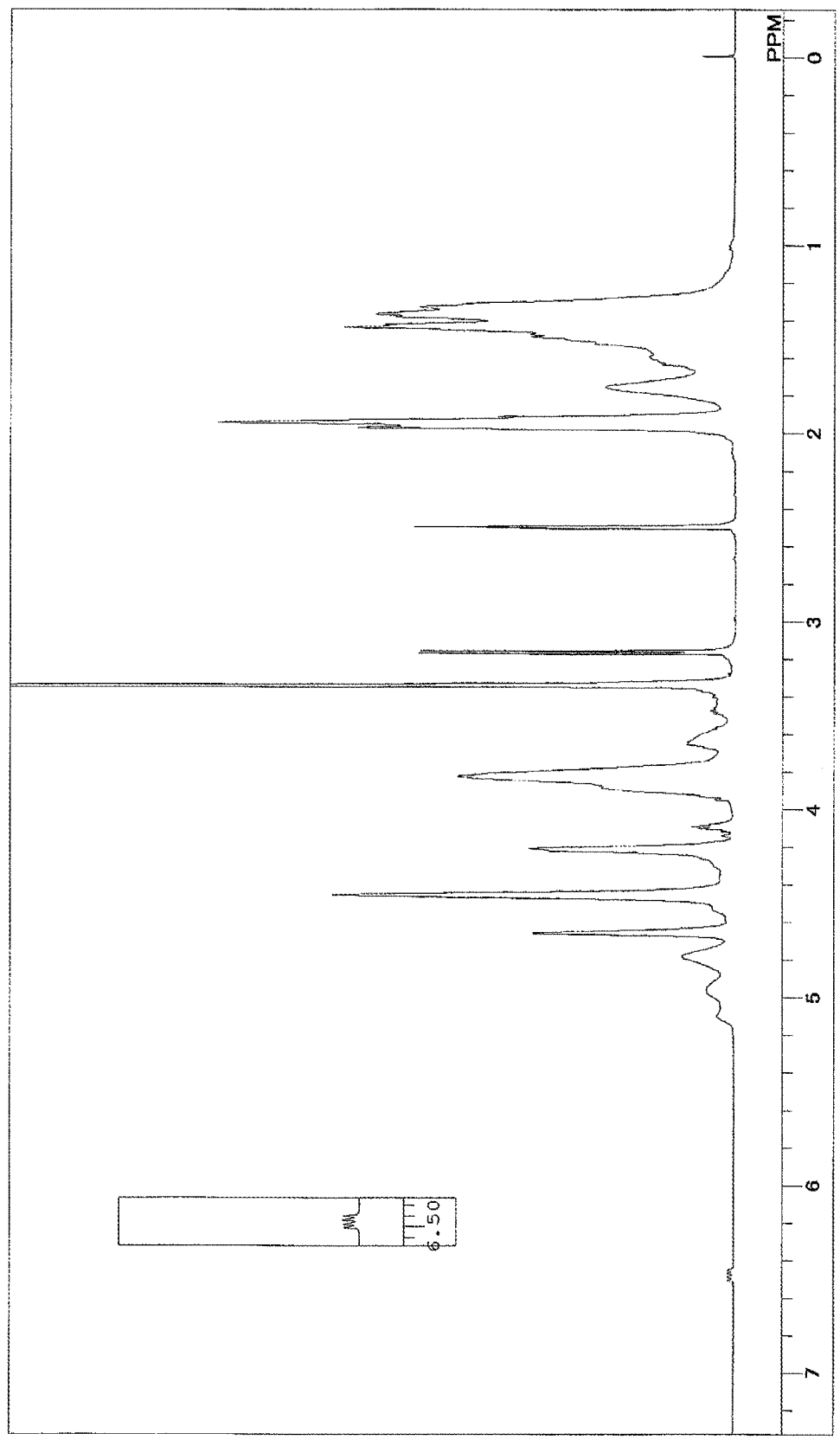
FIG. 2 is a $^1$H-NMR spectrum of a vinyl alcohol-based copolymer obtained in Example 1.

In a 6 L reaction vessel provided with a stirrer, a nitrogen inlet, an additive inlet, and an initiator addition port, 1200 g of vinyl acetate, 1800 g of methanol, 19.8 g of 1,4-butanediol divinyl ether as a polyfunctional monomer were charged, and after temperature rising to 60° C., inside the system was purged with nitrogen by nitrogen bubbling for 30 minutes. The temperature in the reaction vessel was adjusted to 60° C. and 2.5 g of 2,2'-azobis(isobutyronitrile) was added to initiate polymerization. During the polymerization, the polymerization temperature was maintained at 60° C. After three hours, the polymerization was stopped by cooling when the rate of polymerization reached 58%. Subsequently, unreacted vinyl acetate was removed under reduced pressure to obtain a methanol solution of polyvinyl acetate (hereinafter, may be abbreviated as a PVAc). The PVAc thus obtained was subjected to reprecipitation purification using acetone as a good solvent and hexane as a poor solvent five times and dried by vacuum drying. After that, the obtained PVAc was dissolved in deuterated chloroform to perform $^1$H-NMR measurement. The measurement result is illustrated in FIG. 1. From the obtained spectrum in FIG. 1, the amount of the ethylenic double bond being introduced was calculated as 0.5 mol %. The concentration of the methanol solution of PVAc was adjusted to 30%, and an NaOH methanol solution (10% concentration) was added to have an alkali molar ratio (number of NaOH moles/number of vinyl ester unit moles in PVAc) of 0.006 for saponification. The obtained vinyl alcohol-based copolymer was washed with methanol. By the above operations, a vinyl alcohol-based copolymer having a degree of polymerization of 1070 and a degree of saponification of 79.6 mol % was obtained. The obtained vinyl alcohol-based copolymer was dissolved in water at 90° C. to prepare a 4 weight % aqueous solution, and it was dissolved completely. The obtained vinyl alcohol-based copolymer was also dissolved in deuterated dimethyl sulfoxide to perform $^1$H-NMR measurement. The measurement result is illustrated in FIG. 2.

(Suspension Polymerization of Vinyl Chloride)

The vinyl alcohol-based copolymer obtained above was dissolved in deionized water to be in an amount equivalent to 800 ppm relative to vinyl chloride to prepare an aqueous dispersion stabilizer solution. In an autoclave of 5 L capacity, 1150 g of the aqueous dispersion stabilizer solution thus obtained was charged. Subsequently, 1.5 g of a 70% toluene solution of diisopropyl peroxydicarbonate was charged in the autoclave. Degassing was carried out until the pressure in the autoclave became 0.0067 MPa to remove oxygen. After that, 1000 g of vinyl chloride was charged and the temperature of the contents in the autoclave was risen to 57° C. to initiate polymerization while being stirred. The pressure in the autoclave when initiating the polymerization was 0.83 MPa. The polymerization was stopped when seven hours passed after initiating the polymerization and the pressure in the autoclave became 0.44 MPa, and unreacted vinyl chloride was removed. After that, the polymerization slurry was taken out and dried at 65° C. overnight to obtain vinyl chloride polymer particles.

(Evaluation of Vinyl Chloride Polymer Particles)

Regarding the vinyl chloride polymer particles, an average particle diameter, an amount of coarse particles, an amount of scale deposit, and sheet colorability were measured in accordance with the following methods. The results of evaluation are shown in Table 2.

(1) Average Particle Diameter of Vinyl Chloride Polymer Particles

Using a Tyler mesh standard wire gauze, particle size distribution was measured by dry sieve analysis to obtain the average particle diameter.

(2) Amount of Coarse Particles of Vinyl Chloride Polymer Particles

A content of JIS standard sieve 42 mesh-on is expressed in weight %. A smaller number shows less coarse particles and excellent in polymerization stability.

(3) Amount of Scale Deposit

A state of scale deposit on the inner wall of a polymerization vessel after taking the polymer slurry out of the polymerization vessel was visually observed for evaluation in the following criteria.

A: Almost No Scale Deposit
B: Less Scale Deposit
C: Extreme White Scale Deposit (4) Colorability of Vinyl Chloride Polymer Composition Sheet To a porcelain beaker, 100 g of the vinyl chloride polymer particles obtained above, 3 g of dibutyltin bis (maleic acid monoaralkyl ester) salt, 0.01 g of Pigment Blue 29 were respectively added and mixed to obtain a vinyl chloride resin composition. The obtained vinyl chloride composition was kneaded by a test roll at 170° C. for five minutes to produce a sheet having a thickness of 0.4 mm. The sheet was cut into a plurality of sheet pieces of 45×30 mm. From 12 to 14 of the obtained sheet pieces were stacked and pressed at 195° C. for five minutes to produce a test piece having a thickness of 5 mm and the yellow index (YI) was measured using a color meter ("SM-T-H" manufactured by Suga Test Instruments Co., Ltd.).

Examples 2 to 12

Vinyl alcohol-based copolymers were obtained in the same manner as Example 1 other than modifying the type of polyfunctional monomer to be used and the polymerization conditions as shown in Table 1. Then, in the same manner as Example 1, suspension polymerization of vinyl chloride was carried out and the vinyl chloride polymer particles obtained was evaluated. The results are shown in Table 1 and Table 2.

As shown in Table 1 and Table 2, the vinyl alcohol-based copolymers satisfying the configuration of the present invention were dissolved in water at 90° C. to prepare a 4 weight % aqueous solution, and they were dissolved completely. In addition, suspension polymerization of vinyl chloride was carried out using an aqueous dispersion stabilizer solution containing the vinyl alcohol-based copolymer, and the polymer particles thus obtained had a small average particle diameter, less coarse particles were formed, and high polymerization stability was exhibited. It was also possible to reduce scale deposit. It was further found that coloration was suppressed from the evaluation of colorability of the sheet produced from the obtained polymer particles.

Comparative Examples 1 to 9

PVAs were obtained in the same manner as Example 1 other than modifying the type of monomer to be used and the polymerization conditions as shown in Table 1. Then suspension polymerization of vinyl chloride was carried out in the same manner as Example 1 to perform evaluation of the obtained polymer particles. The results are shown in Table 1 and Table 2.

Comparative Examples 1 and 2 show the results of evaluation of unmodified PVAs having no double bond in the molecule. The suspension polymerization of the vinyl chloride monomer was very unstable and blocks were generated due to aggregation of particles during the polymerization.

Comparative Example 3 shows the results of evaluation of vinyl alcohol-based copolymers having an amount of the ethylenic double bond introduced into the molecule of 0.04 mol %. The obtained polymer particles had an average particle diameter of 230 μm and the particle diameter increased. The amount of coarse particles was 10 weight % and many coarse particles were found, and the polymerization was unstable.

Comparative Example 4 and Comparative Example 5 show the results of evaluation of vinyl alcohol-based polymers having a rate of polymerization of vinyl acetate of more than 90% and an amount of introduced double bonds of 0.02 mol %. Although an attempt was made to prepare a 4 weight % aqueous solution by dissolving the obtained vinyl alcohol-based copolymers in water at 90° C., the vinyl alcohol-based copolymers were not dissolved completely and it was not possible to obtain the intended aqueous solutions. In addition, suspension polymerization of vinyl chloride after that was not carried out.

Comparative Example 6 shows the results of evaluation of a vinyl alcohol-based copolymer having an amount of ethylenic double bonds introduced into the molecule of 2.5 mol %. Although an attempt was made to prepare a 4 weight % aqueous solution by dissolving the obtained vinyl alcohol-based copolymer in water at 90° C., the vinyl alcohol-based copolymer was not dissolved completely and it was not possible to obtain the intended aqueous solutions. In addition, suspension polymerization of vinyl chloride after that was not carried out.

Comparative Example 7 shows the results of evaluation of a PVA, as described in Patent Document 3, using acetaldehyde as a chain transfer agent when vinyl acetate was polymerized and having an enone structure introduced into the molecule end. The obtained polymer particles had an average particle diameter was 195 μm and the particle diameter increased. The amount of coarse particles was 3.5 weight % and many coarse particles were found, and the polymerization was unstable. The YI of the produced polyvinyl chloride sheet was 25.6 and coloration was found.

Comparative Examples 8 and 9 show the results of evaluation of PVAs, as described in Patent Document 4, having an enone structure introduced into the molecular chain obtained by copolymerizing vinyl acetate and maleic anhydride. The obtained polymer particles had respective average particle diameters of 220 μm and 180 μm and the particle diameter increased. The amount of coarse particles was 8 weight % and 2.8 weight %, respectively, and many coarse particles were found and the polymerization was unstable. The YI of the produced polyvinyl chloride sheets were 31.9 and 33.2 respectively and coloration was found.

As shown in Examples above, using the new water soluble vinyl alcohol-based copolymer of the present invention having an ethylenic double bond in a side chain, the suspension polymerization of the vinyl chloride monomer is very stable and coloration of shaped articles obtained therefrom is suppressed, which is very significant.

TABLE 1

| | Polymerization Conditions | | | | | |
|---|---|---|---|---|---|---|
| | Vinyl Acetate Amount of Charge (g) | Methanol Amount of Charge (g) | Polyfunctional Monomer | | | Rate of Polymerization (%) |
| | | | Type | Amount of Charge (g) | Molar Ratio of Polyfunctional Monomer [a] | |
| Example 1 | 1200 | 1800 | 1,4-butanediol divinyl ether | 19.8 | 1 | 58 |
| Example 2 | 1200 | 1800 | 1,4-butanediol divinyl ether | 19.8 | 1 | 80 |
| Example 3 | 1200 | 1800 | 1,4-butanediol divinyl ether | 2.97 | 0.15 | 30 |
| Example 4 | 1200 | 1800 | 1,4-butanediol divinyl ether | 49.5 | 2.5 | 25 |
| Example 5 | 840 | 2160 | 1,4-butanediol divinyl ether | 13.9 | 1 | 62 |
| Example 6 | 1200 | 1800 | 1,4-butanediol divinyl ether | 9.9 | 0.5 | 55 |
| Example 7 | 1050 | 1950 | triethylene glycol divinyl ether | 24.7 | 1 | 60 |
| Example 8 | 840 | 2160 | polyethylene glycol diallyl ether | 49.3 | 1 | 60 |
| Example 9 | 500 | 1286 | polyethylene glycol diallyl ether | 14.6 | 0.5 | 60 |
| Example 10 | 420 | 1080 | pentaerythritol triallyl ether | 8.3 | 0.67 | 50 |
| Example 11 | 1200 | 1800 | 1,9-decadiene | 28.9 | 1 | 50 |
| Example 12 | 1200 | 1800 | 1,9-decadiene | 57.8 | 2 | 50 |
| Comparative Example 1 | 1800 | 1200 | — | — | — | 60 |
| Comparative Example 2 | 1800 | 1200 | — | — | — | 60 |
| Comparative Example 3 | 1200 | 1800 | 1,4-butanediol divinyl ether | 1.98 | 0.09 | 58 |
| Comparative Example 4 | 1200 | 1800 | 1,4-butanediol divinyl ether | 19.8 | 1 | 95 |
| Comparative Example 5 | 840 | 2160 | polyethylene glycol diallyl ether | 49.3 | 1 | 92 |
| Comparative Example 6 | 1200 | 1800 | 1,4-butanediol divinyl ether | 99 | 5 | 30 |
| Comparative Example 7 | 1800 | 1200 | (acetaldehyde) | 25 | — | 60 |
| Comparative Example 8 | 1800 | 1200 | (maleic anhydride) | b) | — | 60 |
| Comparative Example 9 | 1500 | 1500 | (maleic anhydride) | c) | — | 60 |

[a] based on 100 mol of vinyl acetate
b) Initial amount of charge was 5 g. 187 mL of 20 weight % methanol solution was post added over four hours.
c) Initial amount of charge was 4.2 g. 156 of 20 weight % methanol solution was post added over 4.5 hours.

TABLE 2

| | Vinyl Alcohol-Based Copolymer | | | | Vinyl Chloride Polymer Particles | | | |
|---|---|---|---|---|---|---|---|---|
| | Amount of Ethylenic Double Bond being Introduced (mol %) | Degree of Polymerization | Degree of Saponification (mol %) | Water Solubility | Average Particle Diameter (μm) | Coarse Particles Amount (weight %) | Scale Deposit Amount | Sheet Colorability (YI) |
| Example 1 | 0.5 | 1070 | 79.6 | Soluble | 143 | 1.3 | A | 20.1 |
| Example 2 | 0.1 | 1350 | 77.0 | Soluble | 150 | 0.1 | A | 20.3 |
| Example 3 | 0.12 | 800 | 78.0 | Soluble | 135 | 0.8 | A | 20.0 |

TABLE 2-continued

| | Vinyl Alcohol-Based Copolymer | | | | Vinyl Chloride Polymer Particles | | | |
|---|---|---|---|---|---|---|---|---|
| | Amount of Ethylenic Double Bond being Introduced (mol %) | Degree of Polymerization | Degree of Saponification (mol %) | Water Solubility | Average Particle Diameter (μm) | Coarse Particles Amount (weight %) | Scale Deposit Amount | Sheet Colorability (YI) |
| Example 4 | 1.6 | 1500 | 75.8 | Soluble | 143 | 0.8 | B | 22.0 |
| Example 5 | 0.4 | 670 | 73.7 | Soluble | 158 | 0.6 | A | 19.8 |
| Example 6 | 0.2 | 760 | 72.2 | Soluble | 137 | 1.3 | B | 20.0 |
| Example 7 | 0.5 | 520 | 78.0 | Soluble | 135 | 0.8 | B | 21.5 |
| Example 8 | 0.3 | 1200 | 72.0 | Soluble | 117 | 1.2 | A | 21.8 |
| Example 9 | 0.2 | 420 | 71.9 | Soluble | 130 | 0.4 | B | 20.5 |
| Example 10 | 0.3 | 1280 | 75.0 | Soluble | 158 | 1.5 | B | 21.0 |
| Example 11 | 0.8 | 850 | 79.0 | Soluble | 148 | 0.8 | A | 20.0 |
| Example 12 | 1.6 | 1500 | 85.0 | Soluble | 155 | 0.3 | B | 20.4 |
| Comparative Example 1 | — | 1050 | 80.0 | Soluble | Unable to measure due to blocking | | | |
| Comparative Example 2 | — | 1050 | 72.5 | Soluble | Unable to measure due to blocking | | | |
| Comparative Example 3 | 0.04 | 800 | 77.8 | Soluble | 230 | 10 | C | 20.5 |
| Comparative Example 4 | 0.02 | — | — | Insoluble | — | — | — | — |
| Comparative Example 5 | 0.02 | — | — | Insoluble | — | — | — | — |
| Comparative Example 6 | 2.5 | — | — | Insoluble | — | — | — | — |
| Comparative Example 7 | — | 650 | 71.5 | Soluble | 195 | 3.5 | C | 25.6 |
| Comparative Example 8 | Amount of Maleic Acid (Anhydride) Unit being Introduced was 2 mol % | 1100 | 79.4 | Soluble | 220 | 8 | C | 31.9 |
| Comparative Example 9 | Amount of Maleic Acid (Anhydride) Unit being Introduced was 2 mol % | 720 | 71.5 | Soluble | 180 | 2.8 | B | 33.2 |

The invention claimed is:

1. A method for producing a vinyl polymer, the method comprising:
   polymerizing at least one vinyl-based monomer in the presence of a dispersion stabilizer,
   wherein the dispersion stabilizer is at least one vinyl alcohol-based copolymer, obtained by copolymerizing vinyl acetate and at least one polyfunctional monomer to obtain at least one vinyl ester-based copolymer and saponifying the at least one vinyl ester-based copolymer, thereby obtaining the at least one vinyl alcohol-based copolymer,
   wherein:
   the at least one polyfunctional monomer comprises two or more ethylenic double bonds in a molecule of the at least one polyfunctional monomer,
   the at least one vinyl alcohol-based copolymer comprises at least one side chain comprising at least one ethylenic double bond and has a molar ratio (d) of the at least one ethylenic double bond to a total of vinyl alcohol units and vinyl acetate units of 0.05/100 to 2/100,
   the at least one vinyl alcohol-based copolymer is water soluble, and
   the copolymerization is carried out at a molar ratio (p) of the at least one polyfunctional monomer to the vinyl acetate of from 0.1/100 to 5/100.

2. The method of claim 1, wherein the at least one side chain comprises at least one vinyl ether group.

3. The method of claim 1, wherein the at least one side chain comprises at least one allyl group.

4. The method of claim 1, wherein a ratio (d/p) of the molar ratio (d) to the molar ratio (p) is from 0.2 to 0.8.

5. The method of claim 1, wherein a rate of polymerization of the vinyl acetate is from 20% to 90%.

6. The method of claim 1, wherein the molar ratio (p) is from 0.15/100 to 3/100.

7. The method of claim 1, wherein the molar ratio (p) is from 0.2/100 to 2/100.

8. The method of claim 1, wherein a copolymerization temperature of the vinyl acetate and the at least one polyfunctional monomer is from 0° C. to 200° C.

9. The method of claim 1, wherein a copolymerization temperature of the vinyl acetate and the at least one polyfunctional monomer is from 30° C. to 140° C.

10. The method of claim 1, wherein the at least one vinyl alcohol based copolymer has a degree of saponification of form 60 to 99.9 mol. %.

11. The method of claim 1, wherein a viscosity average degree of the polymerization Pη of the at least one vinyl alcohol-based copolymer is 200 or more.

12. A method for producing a vinyl polymer, the method comprising:
   copolymerizing vinyl acetate and at least one polyfunctional monomer to obtain at least one vinyl ester-based copolymer and saponifying the at least one vinyl ester-based copolymer, thereby obtaining at least one vinyl alcohol-based copolymer,
   wherein:
   the at least one polyfunctional monomer comprises two or more ethylenic double bonds in a molecule of the at least one polyfunctional monomer, the at least one vinyl alcohol-based copolymer comprises at least one side chain comprising at least one ethylenic double bond and has a molar ratio (d) of the at least one ethylenic double bond to a total of vinyl alcohol units and vinyl acetate units of 0.05/100 to 2/100, and the at least one vinyl alcohol-based copolymer is water soluble, and polymerizing at least one vinyl-based monomer in the presence of a dispersion stabilizer, wherein the dispersion stabilizer comprises the at least one vinyl alcohol-based copolymer.

13. The method of claim 12, wherein the at least one side chain comprises at least one allyl group.

14. The method of claim 12, wherein the copolymerization of the vinyl acetate and the at least one polyfunctional monomer is carried out in the presence of from 0.1 to 10 weight % of a chain transfer agent relative to an amount of the vinyl acetate.

15. The method of claim 12, wherein a rate of polymerization of the vinyl acetate is from 20% to 90%.

16. The method of claim 12, wherein a rate of polymerization of the vinyl acetate is from 30% to 80%.

17. The method of claim 12, wherein the at least one vinyl alcohol-based copolymer has a degree of saponification from 60 to 99.9 mol %.

18. The method of claim 12, wherein a viscosity average degree of the polymerization $P\eta$ of the at least one vinyl alcohol-based copolymer is 200 or more.

19. A dispersion stabilizer, comprising at least one vinyl alcohol-based copolymer and at least one selected from the group consisting of an antiseptic, mildewcide, antiblocking agent, defoamer, water soluble cellulose ether, water soluble polymer, oil soluble emulsifier, and water soluble emulsifier, wherein:

the at least one vinyl alcohol-based copolymer is obtained by copolymerizing vinyl acetate and at least one polyfunctional monomer to obtain at least one vinyl ester-based copolymer and saponifying the at least one vinyl ester-based copolymer, thereby obtaining at least one vinyl alcohol-based copolymer, the at least one polyfunctional monomer comprises two or more ethylenic double bonds in a molecule of the at least one polyfunctional monomer, the at least one vinyl alcohol-based copolymer comprises at least one side chain comprising at least one ethylenic double bond and has a molar ratio (d) of the at least one ethylenic double bond to a total of vinyl alcohol units and vinyl acetate units of 0.05/100 to 2/100, and the at least one vinyl alcohol-based copolymer is water soluble.

20. The method of claim 12, wherein the at least one side chain comprises at least one vinyl ether group.

* * * * *